(12) United States Patent
Dodd

(10) Patent No.: US 6,200,521 B1
(45) Date of Patent: Mar. 13, 2001

(54) WASTE RECOVERY SYSTEM

(76) Inventor: Douglas F. Dodd, 1425 E. Main St., Chattanooga, TN (US) 37404

( * ) Notice: Subject to any disclaimer, the term of this patent is extended or adjusted under 35 U.S.C. 154(b) by 0 days.

(21) Appl. No.: 09/407,578

(22) Filed: Sep. 28, 1999

(51) Int. Cl.[7] .................................................. C22B 13/08
(52) U.S. Cl. ........................................... 266/101; 266/170
(58) Field of Search ..................................... 266/170, 101

(56) References Cited

U.S. PATENT DOCUMENTS 6,042,775 * 3/2000 Steiner et al. ........................ 266/101

* cited by examiner

Primary Examiner—Scott Kastler
(74) Attorney, Agent, or Firm—Alan Ruderman; Miller & Martin

(57) ABSTRACT

A silver waste recovery system including a container having an inlet and an outlet at a lower elevation than the inlet, filler material in a silver cell is in communication with the inlet and a separate non-silver reactive filter is in communication with the outlet. A catch basin is positioned about the silver cell and the non-silver reactive filter contains particulates in the area of the filter and the filler material. Fluid entering the inlet passes through the silver cell and exits into the catch basin. It thereafter enters the non-silver reactive filter and exits from it through the outlet.

19 Claims, 2 Drawing Sheets

WASTE RECOVERY SYSTEM

BACKGROUND OF THE INVENTION

This invention relates to apparatus for silver waste recovery, and more specifically, to a gravity-flow apparatus for use in the recovery of silver from photo processor waste streams.

A number of devices employing containers for recovering silver from photo processor waste streams such as spent fixing solutions from photographic paper and film processes are known in the industry. These devices generally pass the solution containing silver salts through a metal filter. The metal utilized in the metal filter is selected due to its electromotive force series characteristic being higher than that of silver. As the silver salts pass through the metal filter, a chemical replacement action causes the silver to be deposited on the metal filter. When the supply of metal on the metal filter for exchange is exhausted, the contents of the container, especially the used metal filter, are processed at a refinery to recover the silver left therefrom.

In order to safeguard the environment, it is important to be able to control the release of silver-containing solutions into the environment. Known sources of silver containing solutions have traditionally been treated to remove the silver salts from these solutions prior to disposing of the remaining solution into the environment. Attempts have been made, in the prior art, to fashion silver recovery systems that remove a large quantity of silver from the solution prior to the disposal of the solution. Some of these prior art methods unfortunately leave a relatively large silver component in the solution after the solution passes through the silver recovery systems. Currently the EPA has a requirement that waste water have no greater than five parts per million silver content. Additionally, it is also possible that city and state clean water requirements may be more strict. Accordingly, many users of silver containing solutions are in need of an effective silver recovery system.

U.S. Pat. No. 5,837,188 issued to Peterson on Nov. 17, 1998, discloses a metal filter utilized in conjunction with a non-metallic mesh material positioned about and to closely adjacent to an exterior surface of the filler filter material. This patent discusses at least some of the known prior art silver recovery systems. Some of these prior art silver recovery systems utilize steel wool as a metal filter. Others utilize large openings in screen wire permitting solution to bypass the filter material and exit the vessel with silver remaining in the solution. Others utilize solution flow from the bottom of a tube upward through metal shavings and a bed of neutralizing material. While still others utilize a mesh bag to contain the silver material when the core is moved from the interior bag. Finally, others utilize fluid deflectors and baffles to increase the length of fluid flow through the filter.

These prior art silver recovery systems suffer from a number of perceived problems. First, the affluent of the silver recovery systems exits the units after passing last through the metal filter. Accordingly, if any silver particulate breaks off on the metal filter, the silver will likely end up passing out of the unit as effluent. Secondly, if the capacity of the metal filter or filler material is close to the end of its useful life, the user may have trouble visually inspecting to see the amount of useful life left by the unit.

Although some prior art systems have employed a mesh bag around a silver recovery filter, a need exists to provide a more suitable catch for particulate matter in the solution. In the prior art, external portions of the mesh bag may become fouled with particulate and perhaps pass to the outlet and into the environment.

If the filter material of these prior art systems is depleted, then the silver-containing effluent will pass directly to the outlet. As such, the silver-containing effluent may flow outwardly of the system without reacting with the filter material.

SUMMARY OF THE INVENTION

Consequently, it is an object of the present invention to provide a silver recovery system which provides a plating surface for the silver.

It is another object of the present invention to provide a silver recovery system which allows silver to plate on filter material so that the actual silver may serve as a filtering element and a silver recovery component of the system.

It is a further object of the present invention to provide a silver recovery system so as to provide a system which allows for the use of two separate types of filter mechanisms.

It is yet a further object of the present invention to provide a silver recovery system that enhances the purity of the silver which is recovered from the system.

It is still a further object of the present invention to efficiently filter organic chemicals and heavy metals from the effluent of the unit system.

It is still yet a further object of the present invention is to utilize a non-reactive filter closest to the outlet to significantly reduce the opportunity for particulate to exit with the effluent.

It is yet still another object of the present invention to provide a silver recovery system which is relatively inexpensive, easy to use, and easy to manufacture. These and other objects and advantages of the present invention will become apparent from a reading of the attached specification and appended claims.

Accordingly the present invention provides a silver recovery system comprising a container having an inlet and an outlet, a filter having filler material, preferably in the form of silver cell, within the container communicates with the inlet, the silver cell being a metal above silver in the electromotive force series. Enfluent solution passes through the filler material in the silver cell, and thereafter through a second filter, and then to the outlet. Thus, any solution passing through the inlet of the unit must first pass through the silver cell prior to passing through to the outlet as effluent. The second filter is preferably a fabric filter or other non-silver exchanging filter such as a fabric filter. Although the preferred flow path is from the inlet through the silver cell through the fabric filter to the outlet, an overflow spout may be located in the unit to allow for bypassing the second filter to allow overflow to exit the unit.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
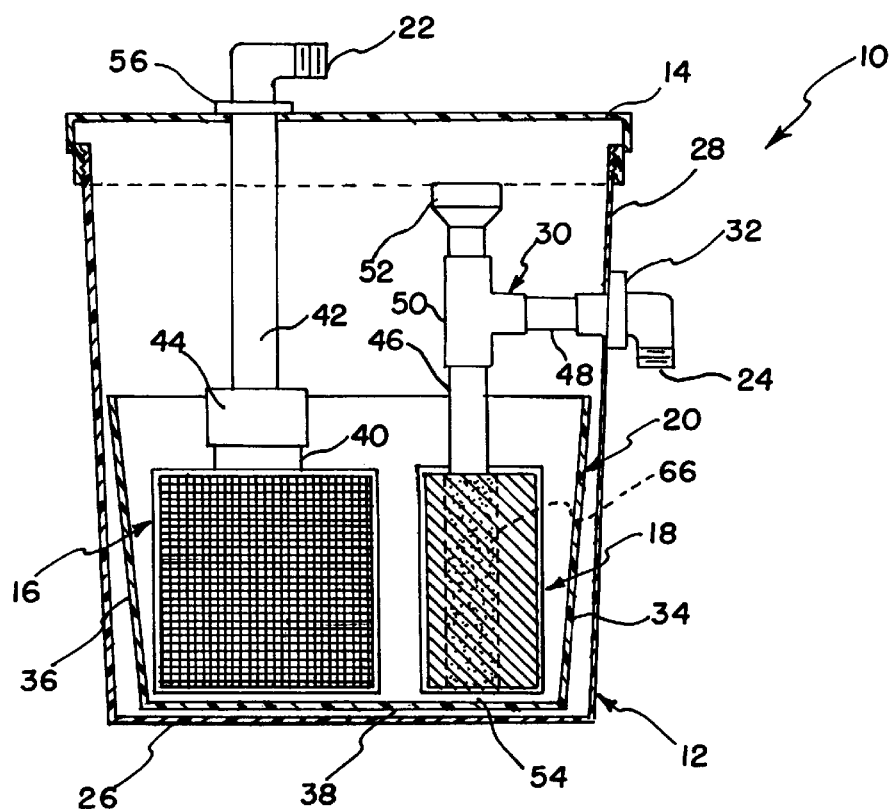
FIG. 1 is a vertical diagrammatic cross-sectional view of apparatus of a silver recovery system constructed in accordance with the present invention.
Figure 2:
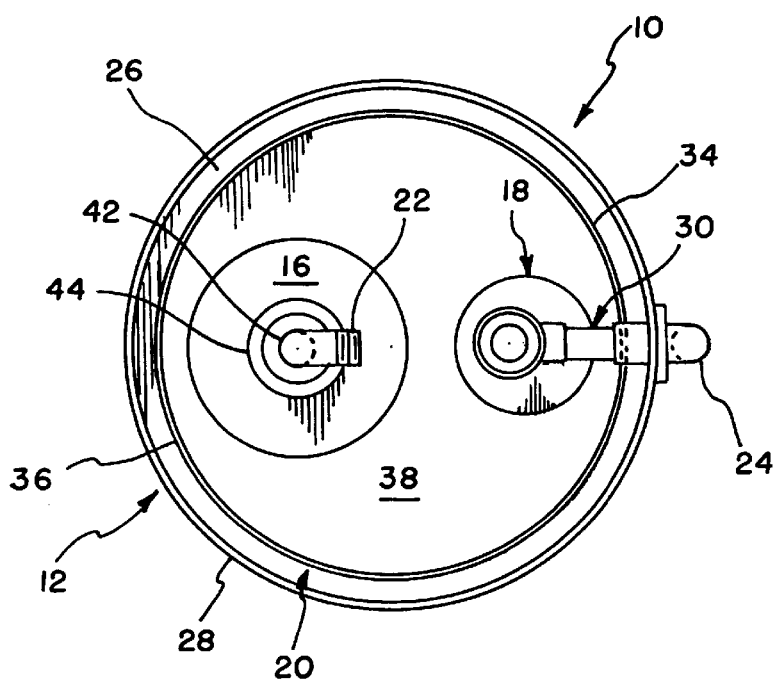
FIG. 2 is a top view of the apparatus of FIG. 1 shown with the lid removed.

Referring now to the drawings, FIGS. 1 and 2 illustrate apparatus forming a silver recovery system 10 according to the present invention, the silver recovery system comprising a container 12, preferably equipped with a lid 14, a filter having filler material shown as silver cell 16, a fabric filter 18 and a catch basin 20.

The container 12 has an inlet 22 and an outlet 24. In the preferred embodiment, the container 12 is a bucket with a base 26 and has the inlet 22 extending through a portion of the lid 14. The outlet 24 extends through a wall 28 of the container 12, the outlet 24 being connected by a connector 30 in the form of a conduit into the filter 18. Where the outlet 24 joins the connector 30 at the wall 28, a seal 32 may be desirable.

As can be seen in FIG. 1, the inlet 22 is located at a higher level than the outlet 24 so that the apparatus may operate as a gravity flow apparatus. The container 12 may be of any standard design, preferably cylindrical, and should be made of a non-reactive, non-corrosive material. The outlet 24 may be equipped with a metallic coupling capable of indicating when silver collection is complete for a particular silver cell 16.

Within the container 12 is housed a catch basin 20. The catch basin 20 is illustrating having sides 34, 36 and bottom 38, but preferably is also cylindrical. In the preferred embodiment, the catch basin 20 has a bottom portion 38 which rests atop the base 26 of the container 20. It is preferred that sufficient room exists between the external periphery of the catch basin 20 and the interior periphery of the walls of the container 12 such that the catch basin 20 may be removed in order to recover silver from the silver cell 16 and/or the catch basin 20 and/or the filter 18.

The operation of the silver recovery system 10 is straight-forward. Effluent such as the produce of spent photographic fixer solutions or other silver salt containing solutions enters through the inlet 22. The enfluent thereafter enters the silver cell 16 and then passes from the interior of the silver cell 16 outwardly and into an internal portion of the container 12. The silver cell 16 is preferably a metallic replacement silver cell as is known in the art containing a filter material including a metal above silver in the electromotive force series.

In the preferred embodiment, the silver cell 16 surrounds a core 40 which has one or more openings so as to allow enfluent to pass from the inlet 22 to the interior portion of the container 12 through the silver cell 16. The core 40 may, if desired, be disconnectibly connected to a tubular conduit 42 by a coupler 44. The conduit 42 is illustrated passing through the lid 14 to connect and communicate with the inlet 22. A second seal 56 may be utilized where the passage 42 extends through lid 14.

By having the effluent pass from the internal portion of the silver cell 16 to the external portion, silver should preferentially plate from the internal portion of the silver cell 16 outward. This process will result in more silver being contained within the silver cell 16. This, it is believed, assists in reducing the amount of silver debris which may collect in the bottom of the catch basin 20. As fluid passes from the interior to the exterior of the silver cell 16 and then to the catch basin 20, the fluid may enter filter 18. Filter 18 is preferably a fabric filter and preferably comprises a 40 micron fabric filter. Within the filter 18 may be located a charcoal core 66. The charcoal core may take the form of activated charcoal granules or an activated charcoal core portion which may further treat solution prior to the solution exit being as effluent.

The non-silver exchanging filter type has been found effective at filtering organic chemicals and assisting in filtering silver and other heavy metals and debris which have been filtered from the enfluent solution. Other non-silver exchanging filters may be used in lieu of the filter 18 or in addition to the filter 18 without departing from the invention.

The fluid exiting the filter 18 passes into connector 30 preferably at first leg 46. From the first leg 46 fluid may enter pipe joint 50 and proceed into second leg 48 through the wall 28 of the container 12 and through the outlet 24 of the silver recovery system. An overflow spout 52 connected to the joint 50 has been found effective in preventing spills from apparatus. The overflow spout 52 is an added safety feature of this silver recovery system 10 if used. The connector 30 is preferably made of a non-corrosive, non-reactive material such as PVC piping. Additionally, the core 40, coupler 44 and passageway 42 are preferably made of a non-corrosive, non-reactive material such as PVC piping. Other material may be substituted and/or utilized.

The filter 18 is illustrated resting atop the catch basin 20 on a foot 54 which has been found effective in providing support for the filter 18. Other and/or additional supports may also be utilized to assist in supporting the filter 18. Additionally, the connector 30 may assist in supporting the filter 18. Although the silver cell 16 is illustrated slightly suspended above the catch basin 20, it is also possible for the silver cell 16 to rest atop a support within the catch basin 20.

Figure 3:
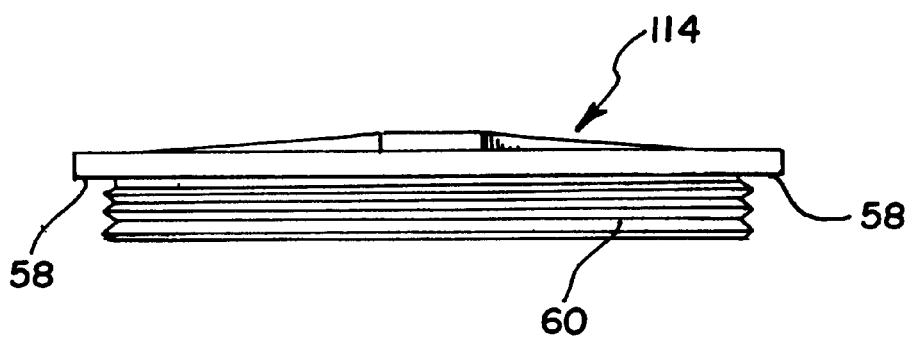
FIG. 3 is a side elevational view of the lid of an alternative embodiment.

FIG. 3 illustrates a side elevational view of the lid 114 of an alternative embodiment of the silver recovery system 10. The lid 114 preferably has ledge 58 which, when installed, is where the lid 114 rests atop a top portion of the wall 28 of the container 12. Threads 60 may be utilized to connect the lid 114 to the container 12. Other connection mechanisms may also be utilized to connect the lid 114 to the container 12.

Figure 4:
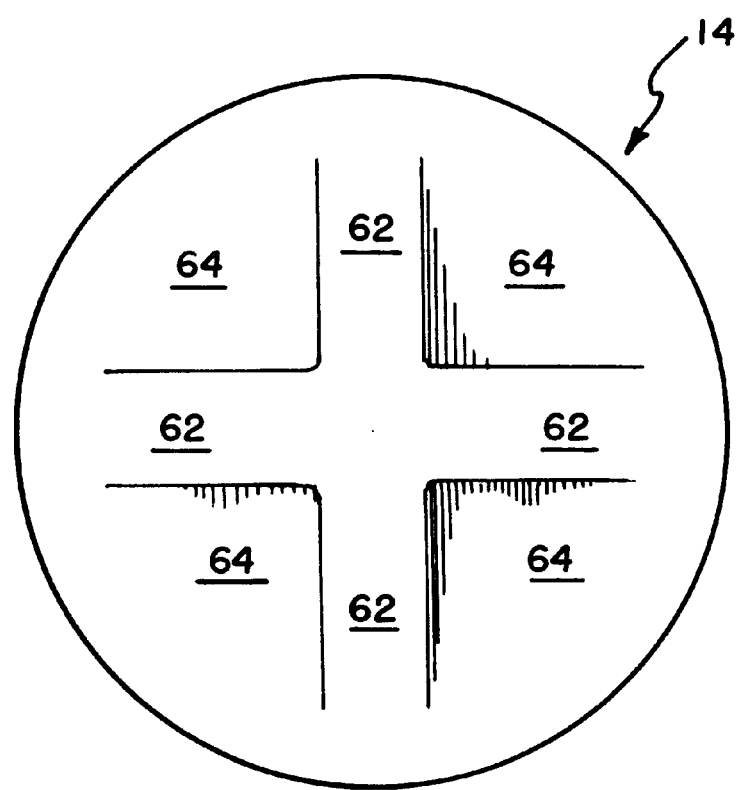
FIG. 4 is a top elevational view of the lid illustrated in FIG. 3.

FIG. 4 is a top view of the lid 114 and illustrates raised portions 62 and recessed portions 64 which may assist a user in connecting the lid 14 to a container 12.

The preferred embodiment may utilize a standard metallic replacement silver recovery cartridge for silver cell 16. Utilizing available equipment, such as a five-gallon bucket for the container 12, the cost of producing the system 10 may be minimized. As aforesaid, PVC piping may be utilized for the connector 30, the coupler 44, the passage 42, the core 40 and the overflow spout 52. Additionally, the inlet 22 and the outlet 24 may be constructed of PVC material. It will be apparent to one skilled in the art that other materials may also be utilized for these as well as other components described herein.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A silver recovery system comprising:
    a container having an inlet and an outlet, a catch basin disposed within the container, a first filter having filler material positioned within said catch basin, said filler material being a metal above silver in the electromotive force series, and a second separate non-reactive filter spaced from the first filter disposed within the catch basin, said second filter having a charcoal core therein, said second filter and said charcoal core in direct communication with the outlet of the container.

2. A silver recovery system comprising:
a container having an inlet and an outlet, a removable catch basin capable of retaining at least some particular matter, said catch basin disposed within the container, a first filter having filler material positioned within said catch basin, said filler material being a metal above silver in the electromotive force series, and a second separate non-reactive filter spaced from the first filter disposed within the catch basin.

3. The silver recovery system of claim 2 wherein the removable catch basin has a bottom portion and a wall.

4. The silver recovery system of claim 3 wherein the wall surrounds said first and said second filters.

5. The silver recovery system of claim 4 wherein the wall extends in a perimeter about both the filler material and the non-reactive filter.

6. A silver recovery system comprising:
a container having an inlet and an outlet, a catch basin disposed within the container, a first filter having filler material positioned within said catch basin, said filler material being a metal above silver in the electromotive force series, a second separate non-reactive filter spaced from the first filter disposed within the catch basin, and in direct communication with the outlet of the container, and an overflow spout within the container in communication with the outlet, said overflow spout capable of directing a fluid to bypass the non-reactive filter.

7. The silver recovery system of claim 1 wherein the filler material is contained within a silver cell.

8. The silver recovery system of claim 7 wherein the silver cell is in direct communication with the inlet of the container.

9. The silver recovery system of claim 1 wherein said container is further comprised of a base, at least one wall, and a lid.

10. A silver recovery system wherein comprising:
a container having an inlet, an outlet, a base, at least one wall and a lid, said lid connects to said at least one wall with threads;
a catch basin disposed within the container;
a first filter having filler material positioned within said catch basin, said filler material being a metal above silver in the electromotive force series; and
a second separate non-reactive filter spaced from the first filter disposed within the catch basin, and in direct communication with the outlet of the container.

11. The silver recovery system of claim 1 where the non-reactive filter is a fabric filter.

12. The silver recovery system of claim 11 wherein the fabric filter is a 40 micron fabric filter.

13. The silver recovery system of claim 11 wherein said non-reactive filter does not contain a metal above silver in the electromotive force series.

14. A silver recovery system comprising:
a container having an inlet and an outlet, said inlet located at a higher elevation than said outlet, a first filter having filler material in direct communication with the inlet of the container, said filler material being a metal above silver in the electromotive force series, said filler material contained within a silver cell connected to said inlet of said container, and a separate non-reactive filter laterally having a charcoal core therein and spaced from said first filter in direct communication with the outlet of the container, said first and second filters being disposed such that a liquid exiting through said first filter must enter said second filter, whereby any of said liquid must pass through said non-reactive filter and said charcoal core prior to exiting the container through the outlet of the container.

15. The silver recovery system of claim 14 wherein the container is a bucket having a lid, said inlet extends through said lid and said outlet extends through a wall of said bucket.

16. The silver recovery system of claim 15 wherein the lid is connected to the bucket by threads.

17. A silver recovery system comprising:
a container having an inlet and an outlet, said inlet located at a higher elevation than said outlet, said container having a base, at least one wall, and a lid;
a first filter having filler material in direct communication with the inlet of the container, said filler material being a metal above silver in the electromotive force series, said filler material contained within a silver cell in direct communication with said inlet of said container;
a separate non-reactive filter in direct communication with the outlet of the container; and
a removable catch basin having a bottom and at least one side, said bottom of said catch basin located below at least one of said non-reactive filter and said silver cell.

18. The silver recovery system of claim 17 wherein said bottom of said removable catch basin is located below both the silver cell and the non-reactive filter.

19. The silver recovery system of claim 1 wherein the charcoal core is comprised of activated charcoal.

* * * * *